(12) United States Patent
Chen (10) Patent No.: US 8,440,073 B2
(45) Date of Patent: May 14, 2013

(54) AQUARIUM DETRITUS REMOVAL SYSTEM

(76) Inventor: Zuoliang Chen, San Francisco, CA (US)

( * ) Notice: Subject to any disclaimer, the term of this patent is extended or adjusted under 35 U.S.C. 154(b) by 323 days.

(21) Appl. No.: 12/928,536

(22) Filed: Dec. 14, 2010

(65) Prior Publication Data

US 2012/0145613 A1 Jun. 14, 2012

(51) Int. Cl.
*A01K 63/04* (2006.01)
(52) U.S. Cl.
USPC .................. 210/167.22; 210/167.23; 119/259
(58) Field of Classification Search ............ 210/167.21, 210/167.22, 167.23, 167.24; 119/259
See application file for complete search history.

(56) References Cited

U.S. PATENT DOCUMENTS

| | | | |
|---|---|---|---|
| 3,722,685 A | 3/1973 | Orensten | |
| 3,759,223 A | 9/1973 | D'Andrea | |
| 3,785,342 A | 1/1974 | Rogers | |
| 5,179,911 A | 1/1993 | Chow | |
| 6,533,928 B1 | 3/2003 | Terato | |
| 6,666,168 B2 * | 12/2003 | Stutz et al. | 119/259 |
| 6,755,981 B2 * | 6/2004 | Terato | 210/805 |

FOREIGN PATENT DOCUMENTS

JP 5-146237 A * 6/1993

* cited by examiner

*Primary Examiner* — Fred Prince (57) ABSTRACT

An aquarium detritus removal and filtration system of the present invention is different from the conventional aquarium filtration system which are not able to deliver detritus settle in an aquarium bottom right to a lift pump for removal. The present invention is mainly comprised of a flow generating device, a flow guiding structure, a screen plate and a lift pump. The flow generating device generate directed flows across the bottom of the aquarium and the flow guiding structure guide these directed flows right to the inlet of a lift pump, so that the lift pump can in take water containing all detritus in the aquarium and deliver these water to a filtering device for filtration

10 Claims, 12 Drawing Sheets

AQUARIUM DETRITUS REMOVAL SYSTEM

BRIEF SUMMARY OF THE INVENTION

An aquarium detritus removal system comprising a flow generating device, a flow guiding structure, a screen plate, a lift pump and a filtering device. This system can generate directed and guided flows across the bottom of an aquarium to deliver all detritus in the aquarium right to the water intake tube of the lift pump for removal, thus completely eliminate the need for manual vacuuming of an aquarium tank.

BACKGROUND

1. Field of the Invention

The present invention relates to an aquarium detritus removal system which can generate directed and guided water flow across the bottom of an aquarium tank to deliver all detritus in the aquarium tank right to the water intake tube of a lift pump for removal.

2. Description of Prior Art

In a closed aquarium system, almost all the possible problems that can occur come down to one cause—decomposing organic matter in the aquarium. So, quickly removing all detritus from an aquarium is crucial for keeping the aquarium in good shape. Unfortunately, traditional filters which use either a water intake tube or an overflow box to intake water for filtration have a serious drawback, that is they can only remove a portion of detritus suspended in the water and unable to remove detritus that build up in the gravel bed or on the bottom. Traditionally, a siphon tube is used to vacuum detritus from the bottom of an aquarium, a time consuming and grueling chores for most aquarium hobbyists. Several filter systems which provide means to avoid such inconvenience have been disclosed in the prior art.

U.S. Pat. No. 5,197,911, issued Jan. 19, 1993 to Hong-Jien Chow and Yi-Min Jian, discloses a filter system that use water from another tank to flush the water and waste material from the bottom portion to a water intake inlet. This is accomplished by forcing water into one end of the bottom portion through a feed tube and drawing the water out of the opposite end.

U.S. Pat. No. 3,759,223, issued Sep. 18, 1973 to Robert D'Andrea, discloses a filter system that allows water and waste material collected in the bottom portion to be drained for removal, a drain spigot disposed through the side of the tank adjacent the bottom allows this to be done with little effort.

U.S. Pat. No. 3,722,685, issued Mar. 27, 1973 to Henry E. Orensten and Vivian C. Orensten, and U.S. Pat. No. 3,785,342, issued Jan. 15, 1974 to George H. Rogers, disclose filter systems which use pumps and filter arrangement to draw water and waste material from the bottom portion of the tank for filtration before returning it to the tank.

U.S. Pat. No. 6,533,928 issued Mar. 18, 2003 to Kuniaki Terato disclose aquarium cleaning system which use flows in the bottom of a tank to blow waste material in the bottom to the intake inlet of a lift pump for removal. In actual situation, because of the water resistance, these flows can not go very far, and because these flows moving at different angles, these flow will interfere with each other to create vortex on the bottom of the tank, thus not able to deliver all detritus to the lift pump for removal, especially for a large tank, so that the effectiveness of these invention is very limited.

Advantages of the Invention

The present invention can automatically remove detritus suspended in water or settled in gravel bed from an aquarium, totally eliminate the need for manual aquarium vacuuming.

The screen structure in the present invention can provide powerful biological filtration.

The present invention can be easily install in an aquarium tank and does not require any change or modification to the aquarium tank's structure or appearance.

BRIEF DESCRIPTION OF THE DRAWINGS

FIG. 6-1 illustrate a flow generating device and a tank width side and a tank length side being used as flow guiding walls.

FIG. 6-2 illustrate a flow generating device and a strip being used as flow guiding wall.

FIG. 7-1 illustrate a flow generating device and two strips being used as flow guiding walls.

FIG. 7-2 illustrate a flow generating device and two strips and a tank width side being used as flow guiding walls.

REFERENCE NUMERALS IN DRAWINGS

1 flow generating device
10 flows
11 flow pump
111 flow pump inlet
112 flow pump outlet
12 width flow pipe
121 width flow nozzles
13 width water pipe
14 length flow pipes
141 length flow nozzles
142 flow pipe section
15 fittings
2 lift pump
21 lift pump inlet
22 lift pump outlet
3 flow guiding structure
31 central flow guiding wall
32 corner flow guiding wall
4 screen plate
40 small holes on screen plate
41 flow pump outlet hole
42 lift pump inlet hole
43 screen plate section
44 section fixture
5 filtering device
51 filtering device inlet
52 filtering device outlet
6 gravel 7 tank
71 tank bottom
72 tank width side
73 tank length side

DETAILED DESCRIPTION OF THE PREFERRED EMBODIMENT

The present invention is base on the principle that water always flow through the least resistant path, so that a lift pump in an aquarium can only intake solid detritus from a very small area around its water intake inlet, that means to effectively remove all detritus from an aquarium, all detritus must be delivered right to the water intake inlet of a lift pump for removal.

Figure 1:
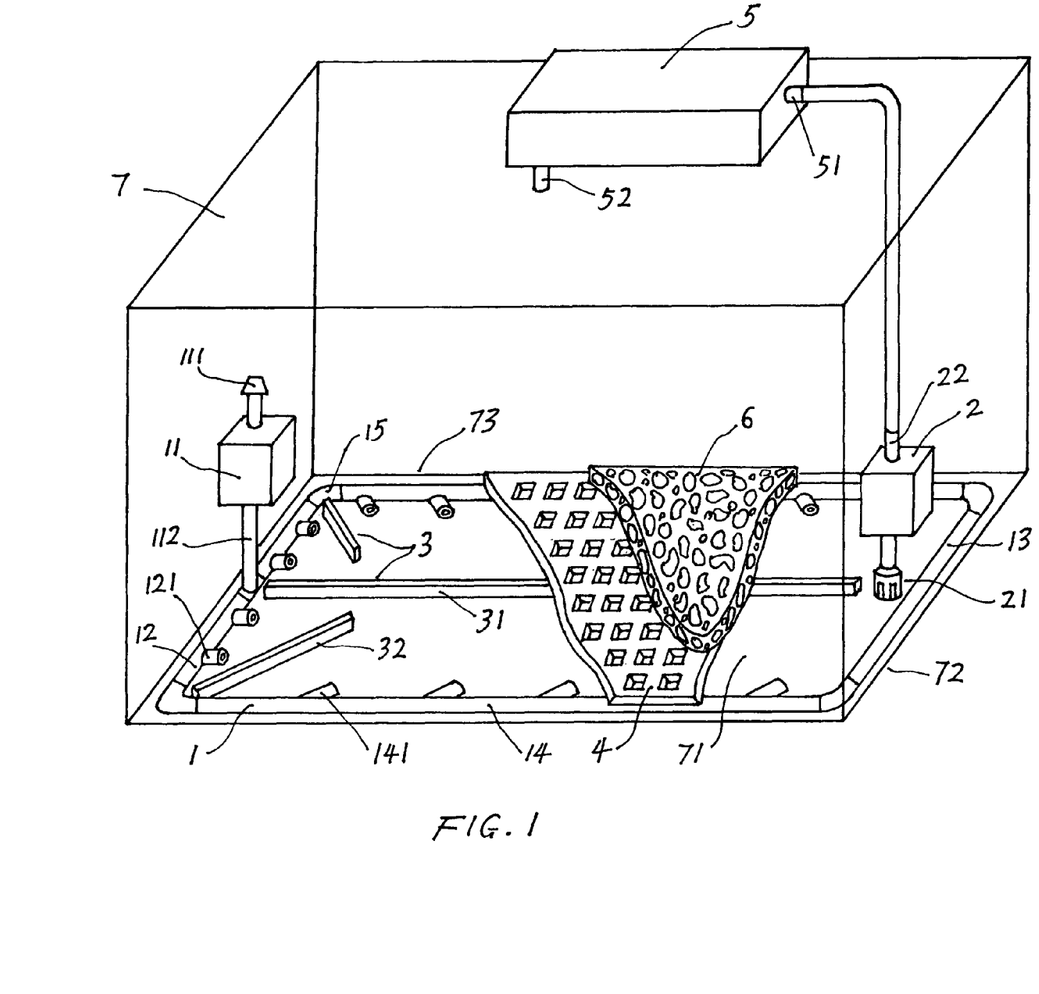
FIG. 1 is a perspective view of the present invention.

A typical embodiment of the present invention is illustrated in FIG. 1, the present invention is used to remove detritus from an aquarium tank 7 which having a tank bottom 71, two tank width sides 72 and two tank length sides 73, tank length side 73 is not shorter than tank width side 72.

The present invention comprising a flow generating device 1, a lift pump 2, a flow guiding structure 3, a screen plate 4 and a filtering device 5.

Figure 2:
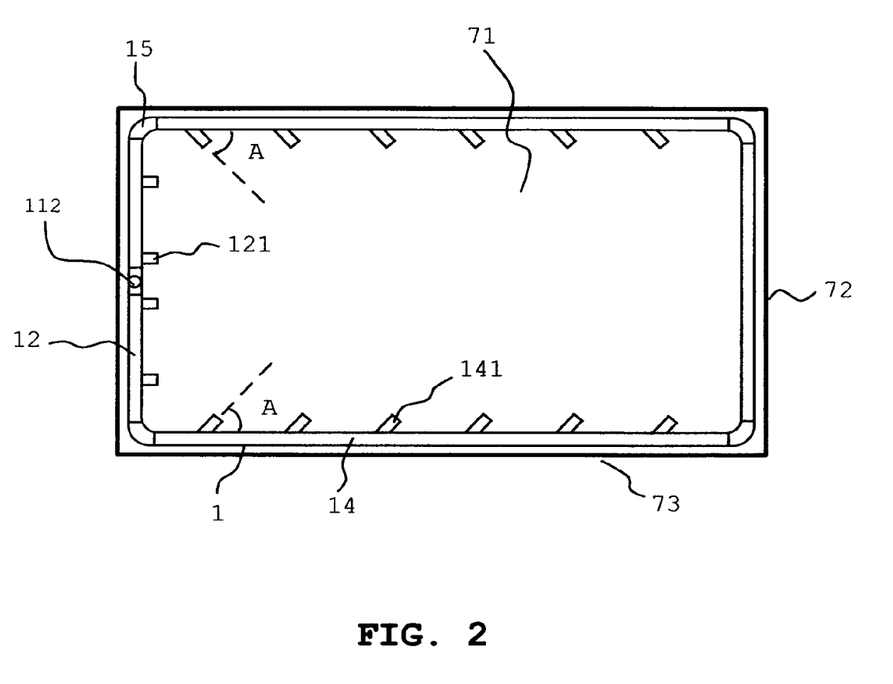
FIG. 2 is a top view of flow generating device on a tank bottom (flow pump is not shown).

As illustrated in FIG. 1 and FIG. 2, flow generating device 1 further comprising a flow pump 11, a width flow pipe 12, a width water pipe 13, and two length flow pipes 14. The heights of all flow pipes and water pipe are the same. Width flow pipe 12 and width water 13 are slightly shorter than tank width side 72 and are placed on tank bottom 71 and along each tank width sides 72. There are a plurality width flow nozzles 121 mounted on one side and along the length of width flow pipe 12, and point to the direction of width water pipe 13. Length flow pipes 14 are slightly shorter than tank length side 73 and are placed on tank bottom 71 and along each tank length side 73. There are a plurality of length flow nozzles 141 mounted on one side and along the length of each length flow pipes 14, these length flow nozzles 141 point to the opposite length flow pipe at an angle A. Angle A is larger than 15 degrees but less than 75 degrees, preferably in the range of 30 to 60 degrees. Width flow pipe 12, width water pipe 13 and length flow pipes 14 are jointed together by fittings 15 to form a closed loop so that water can move inside the loop. Flow pump 11 is connected to width flow pipe 12, with flow pump outlet 112 being connected to the middle portion of width flow pipe 12, and flow pump inlet 111 extended in the upper portion of tank 7.

Such that water in the upper portion of tank 7 can be taken in by flow pump 11 via flow pump inlet 111, this water is then pumped out via flow pump outlet 112 to width flow pipe 12, length flow pipes 14, width water pipe 13, and then forced out of width flow nozzles 121 and length flow nozzles 141 to generate directed flows across tank bottom 71.

Figure 3:
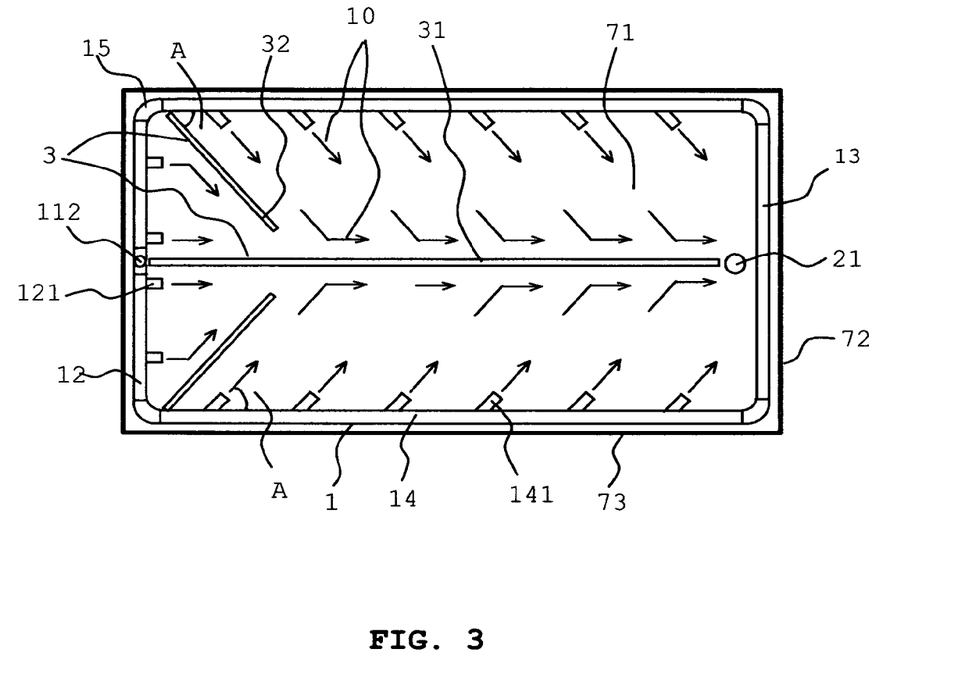
FIG. 3 is a top view of flow generating device and flow guiding structure on a tank bottom (flow pump and lift pump are not shown).
Figure 4:
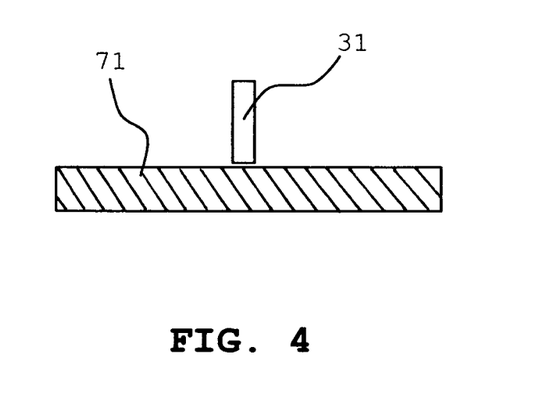
FIG. 4 is a cross section view of a flow guiding wall sitting on a tank bottom.

As illustrated in FIG. 1, FIG. 3, and FIG. 4, a flow guiding structure 3 is placed on tank bottom 71 and within flow generating device 1. Flow guiding structure 3 is constructed from thin strips having a height the same as the flow pipes in flow generating device 1. These strips are vertically placed on tank bottom 71 to form flow guiding walls. These flow guiding walls are arranged in such ways that they are capable of separating water flows and changing the direction of water flows. Flow guiding structure 3 mainly comprising a central flow guiding wall 31 and two corner flow guiding walls 32, and preferably four other small curve walls (not shown) on the four corners of flow generating device 1. Central flow guiding wall 31 is placed along the middle of flow generating device 1 and parallel to length water pipes 14. Central flow guiding wall 31 having one end in contact or close to the middle of width flow pipe 12, having the other end extend to the middle of width water pipe 13, and being an appropriate distance away from the middle of width water pipe 13. The two corner flow guiding walls 32 are placed on each of the corners of flow generating device 1 that close to width flow pipes 12. Each corner flow guiding wall 32 having one end in contact or close to the corner, having the other end extend to central flow guiding wall 31 at angle A, and being an appropriate distance away from central flow guiding wall 31.

Such that flows coming out from width flow nozzles 121 will be separated from flows coming out from length flow nozzles 141 by corner flow guiding walls 32 until they are close to central flow guiding wall 31, so that they won't interfere with each other to form vortex. Flows coming out from width flow nozzles 121 are also guided by corner flow guiding walls 32 toward central flow guiding wall 31, then redirected by central flow guiding wall 31 and move along central flow guiding wall 31 toward the middle of width water pipe 13. Flows coming out from length flow nozzles 141 will move toward central flow guiding wall 31 at angle A, when they hit central flow guiding wall 31, they will be redirected by central flow guiding wall 31 to move along central flow guiding wall 31 toward the middle of width water pipe 13. Since flows coming out from length side flow nozzles 141 on the same length water pipe are at the same angle A, they won't interfering with each to create vortex. Flows coming out from opposite length flow nozzles 141 are separated by central flow guiding wall 31 and won't interfere with each other to form vortex too.

Such that all flows coming out from width flow nozzles 121 and length flow nozzles 141 are moving toward central flow guiding wall 31, redirected by central flow guiding wall 31 and move along central flow guiding wall 31 toward the middle of width water pipe 13.

Figure 5:
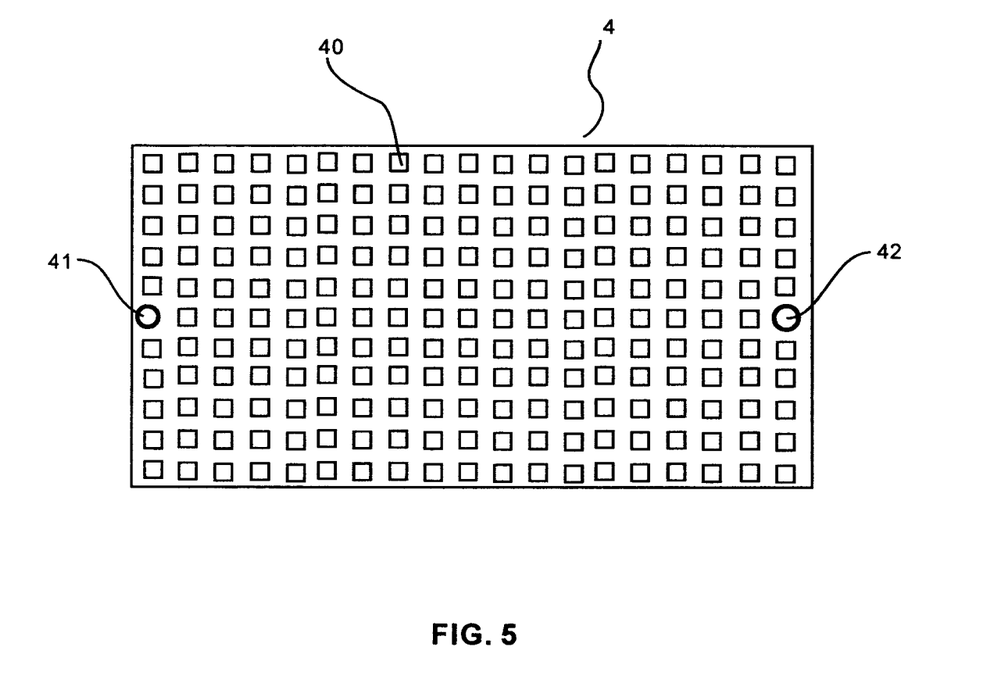
FIG. 5 is the top view of a screen plate.

As illustrated in FIG. 1 and FIG. 5, a screen plate 4 larger than flow generating device 1 but smaller than tank bottom 71 is placed on top of flow generating device 1 and flow guiding structure 3. Flow generating device 1 and flow guiding structure 3 also act as support for screen plate 4. There are a number of small holes 40 all over screen plate 4. These small holes 40 allow water and detritus to pass through screen plate 4 but prevent objects like gravel from falling under screen plate 4. There is a flow pump outlet hole 41 on screen plate 4 to allow flow pump outlet 112 to extend through it. There is a lift pump inlet hole 42 on screen plate 4 to allow lift pump inlet 21 to extend through it. It is preferably to make screen plate thicker than 3 mm, such that small holes 40 can provide more surface bedding area for beneficiary bacteria, so that less gravel is needed for providing surface bedding area for beneficiary bacteria.

As illustrated in FIG. 1, a lift pump 2 is placed near tank width side 72 that opposite to flow pump 11, with lift pump inlet 21 placed under screen plate 4, and locate between the middle of width water pipe 13 and the end of central flow guiding wall 31.

Such that all flows moving along central flow guiding wall 31 toward the middle of width side water pipe 13 will pass lift pump inlet 21.

As illustrated in FIG. 1, lift pump outlet 22 is connected to filtering device inlet 51, such that water containing detritus taken in by lift pump 2 will be delivered to filtering device 5 for filtration, the filtered water will be returned to tank 7 via filtering device outlet 52.

As illustrated in FIG. 1, a layer of gravel 6 can be placed on top of screen plate 4 to conceal screen plate 4, as well as provide tremendous surface bedding area for beneficiary bacteria for providing biological filtration. The size of gravel should be larger than the size of small holes 40 so that they won't fall under screen plate 4. It is preferable to use larger gravel in the present invention, such that detritus in an aquarium can fall under screen plate 4 faster and be removed.

Operation of the Preferred Embodiment

When tank 7 is filled with water and the present invention works, flow pump 11 intakes water from the upper portion of tank 7 via flow pump inlet 111 and deliver the water to width flow pipe 12, length flow pipes 14 and width water pipe 13, since width flow pipe 12, width water pipe 13 and length flow pipes 14 are formed into a closed loop, this water is then forced out of width flow nozzles 121 and length flow nozzles 141 to generate directed flows across tank bottom 71. Flows coming out from width flow nozzles 121 will be separated from flows coming out from length flow nozzles 141 by corner flow guiding walls 32 until they are very close to central flow guiding wall 31, so that they won't interfere with each other to create vortex. Flows coming out from width flow nozzles 121 are also guided by corner flow guiding walls 32 toward central flow guiding wall 31, redirected by central flow guiding wall 31 and move along central flow guiding wall 31 toward lift pump inlet 21. Flows coming out from length flow nozzles 141 will move toward central flow guiding wall 31 at angle A, when they hit central flow guiding wall 31, they will be redirected by central flow guiding wall 31 to move along central flow guiding wall 31 toward lift pump inlet 21. Since flows coming out from length flow nozzles 141 on the same length flow pipe moving at the same angle A, they won't interfering with each to create vortex. Flows coming out from opposite length flow nozzles 141 are separated by central flow guiding wall 31 and won't interfere with each other to form vortex too.

Such that all flows coming out from width flow nozzles 121 and length flow nozzles 141 are moving toward central flow guiding wall 31, redirected by central flow guiding wall 31 and move along central flow guiding wall 31 toward lift pump inlet 21, when these flows move close enough to lift pump inlet 21, they are taken in by lift pump 2.

Also, when flows coming out from width flow nozzles 121 and length flow nozzles 141 move across tank bottom 71, they create downward flows through gravel bed 6 and screen plate 4 to pull detritus in gravel bed 6 down under screen plate 4 (detritus in gravel bed 6 will settle down under screen plate 4 by itself even without downward flows, but will take longer time). Detritus that fall under screen plate 4 are then carried away by flows 10 right to lift pump inlet 21. Lift pump 2 will lift the detritus containing water to filter box 5 for filtration and returning the filtered water back to tank 7.

Ramification, Scope and Improvements

Accordingly, the reader will see that the aquarium detritus removal system of the present invention is different from the conventional aquarium filtration system which are not able to deliver detritus settle in an aquarium bottom right to a lift pump for removal. The present invention is mainly comprised of a flow generating device, a flow guiding structure, a screen plate, a lift pump and a filtering device. The flow generating device generate directed flows across the bottom of the aquarium, and the flow guiding structure will guide these directed flows right to the lift pump inlet, so that the lift pump can in take water containing all detritus in the aquarium and deliver these water to a filtering device for filtration. Although the description above contains many specificities, these should not be construed as limiting the scope of the present invention but as merely providing illustrations of some of the presently preferred embodiments of this invention. For example, the tank width side and the tank length side can be used as flow guiding walls, the flow nozzles and flow guiding structure can be arranged in many different ways as long as flows coming out from all flow nozzles can be guided to the lift pump inlet. For example, as illustrated in FIG. 6-1, where one of tank length side and one of tank width side are used as flow guiding walls, and all flow nozzles point to these flow guiding walls at an angle; as illustrated in FIG.6-2, a strip 3 is placed on tank bottom 71 as flow guiding wall, and all flow nozzles point to this flow guiding wall at an angle; as illustrated in FIG. 7-1, two strips 3 are placed on tank bottom 71 as flow guiding walls, and all flow nozzles point to these flow guiding walls 3 at an angle; as illustrated in FIG.7-2, two strips 3 are placed on tank bottom 71 as flow guiding walls, width flow nozzles point to these flow guiding walls at an angle, and length flow nozzles are parallel to these flow guiding walls, one of the tank width side act as a flow guiding wall. From these examples, the reader will also see that flows coming out of flow nozzles at different angles are separated by flow guiding walls until they are redirected by a flow guiding wall or reach lift pump inlet 21.

Figure 8:
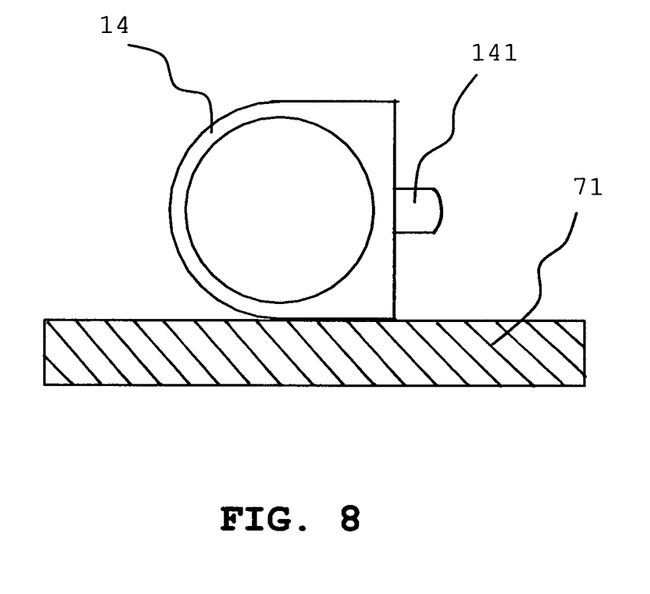
FIG. 8 is a cross section view of an improved length flow pipe sitting on a tank bottom.
Figure 9:
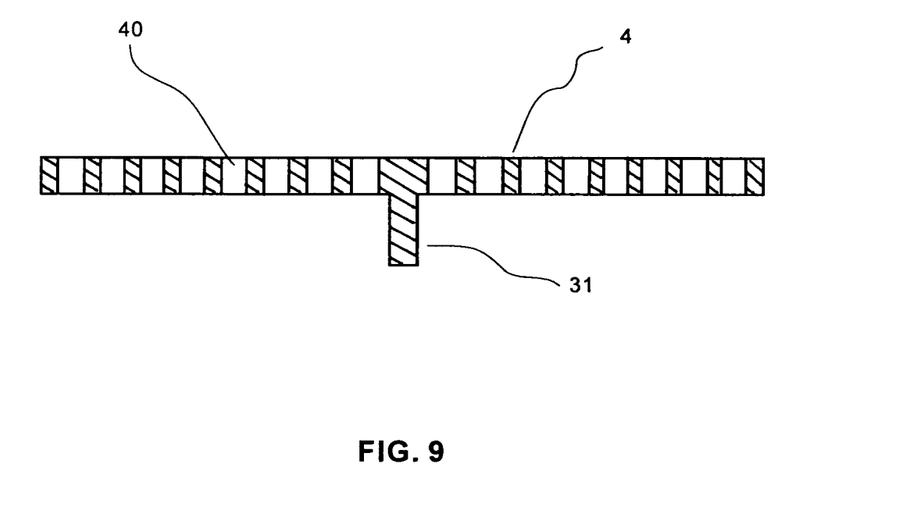
FIG. 9 is a cross section view of a screen plate and a flow guiding wall made into one piece.
Figure 10:
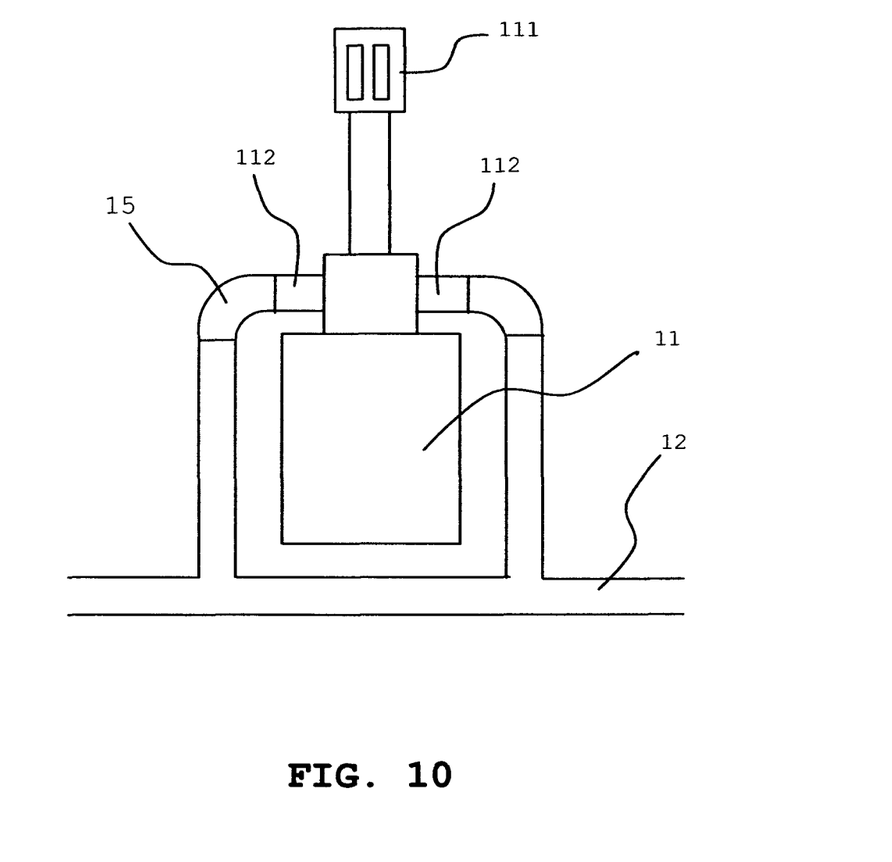
FIG. 10 is a side view of an improved flow pump having two flow pump outlets.
Figure 11:
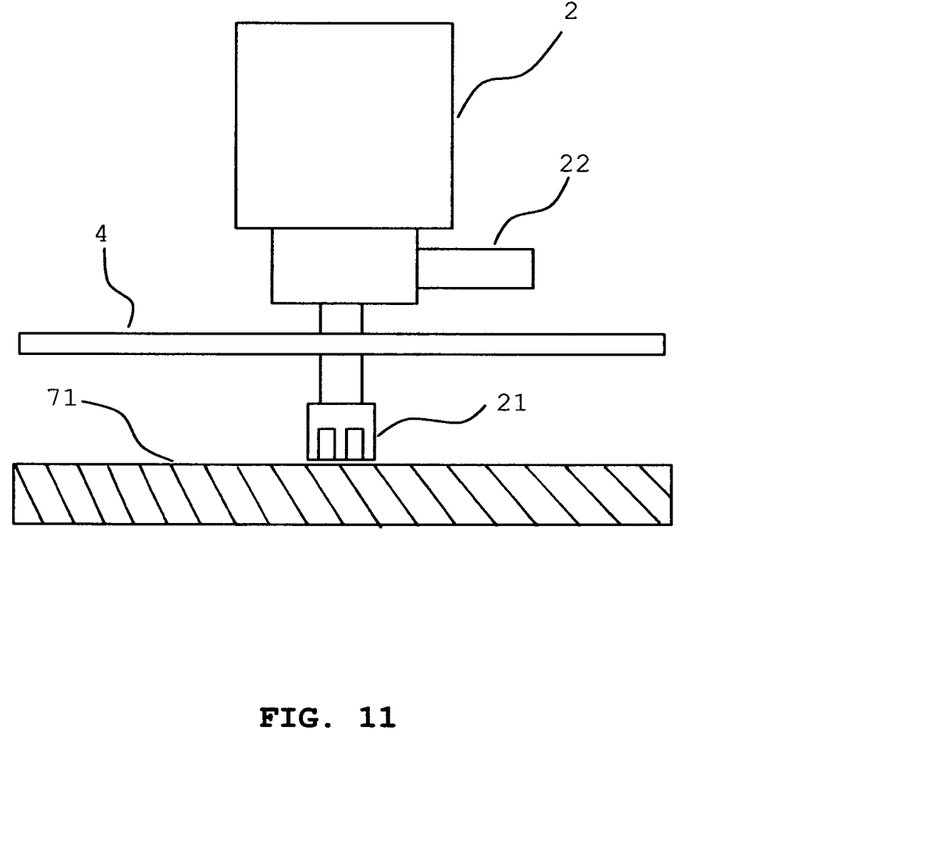
FIG. 11 is a side view of a lift pump with lift pump inlet placed very closed to tank bottom.
Figure 12:
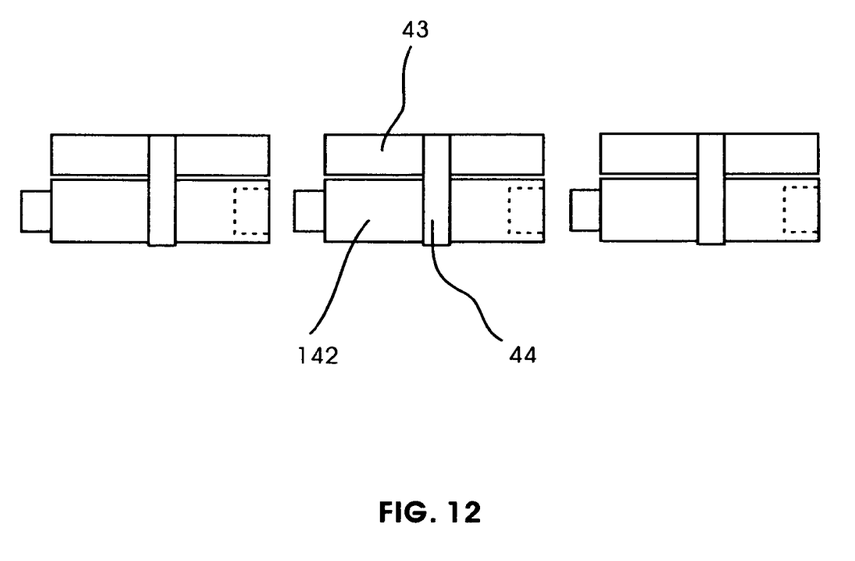
FIG. 12 is a side view of screen plate and water pipe sections.
Figure 61:
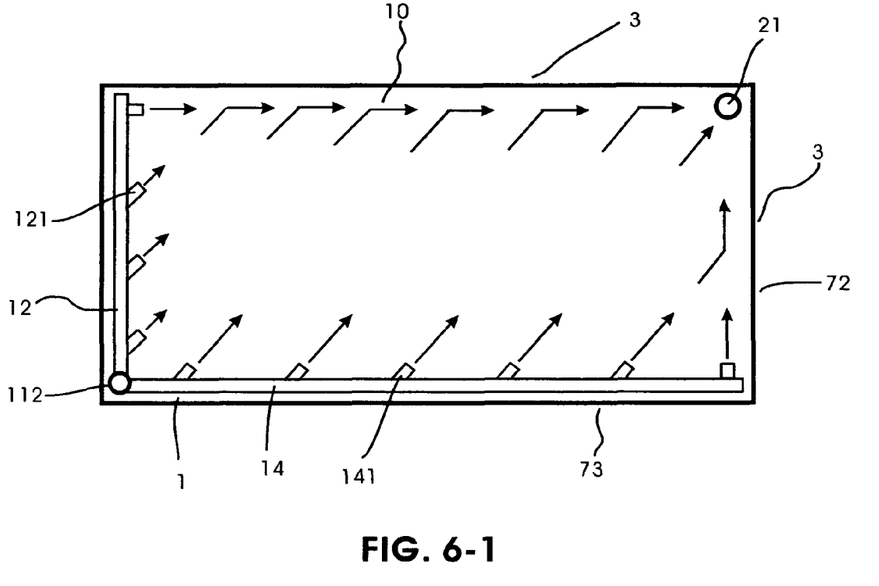
Figure 62:
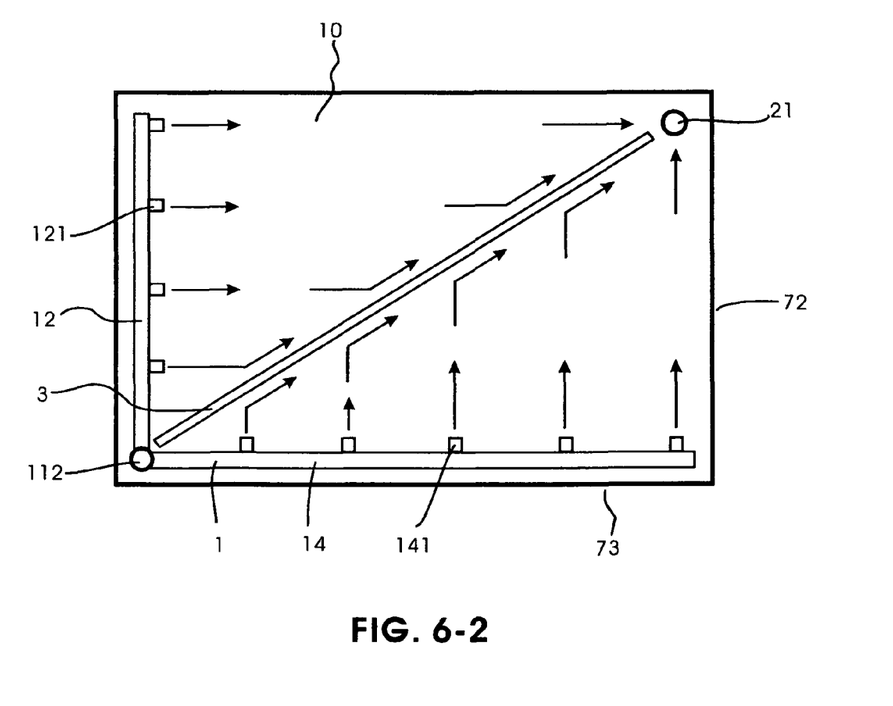
Figure 71:
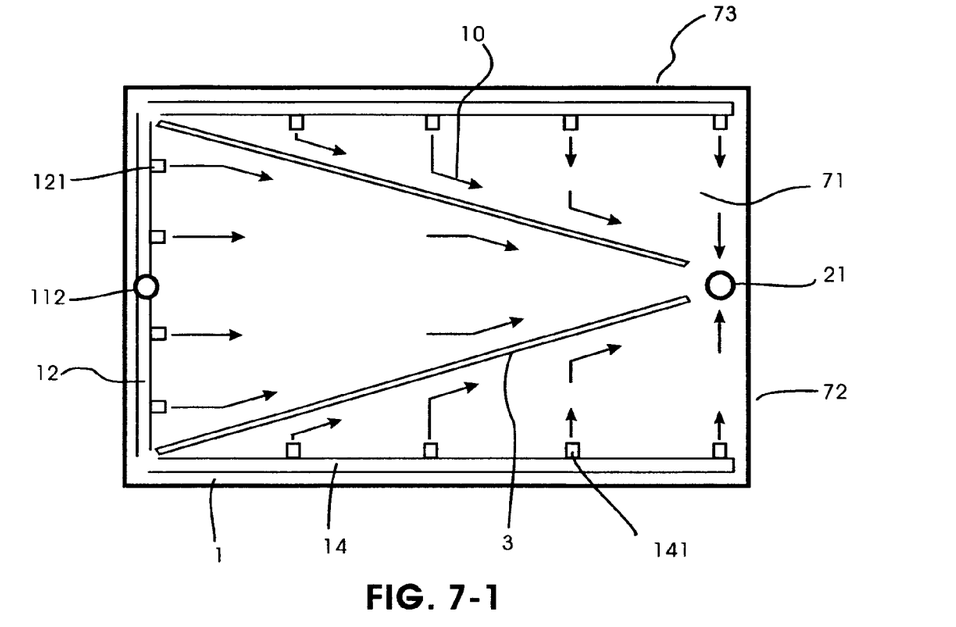
Figure 72:
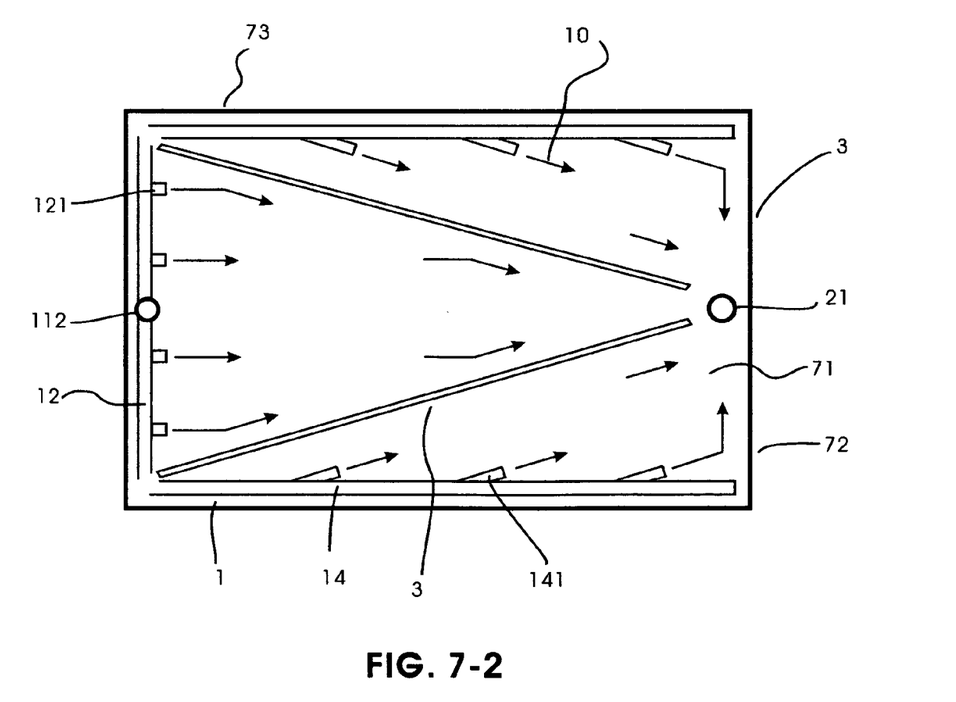

Also, many improvement can be made, for example, as illustrated in FIG. 8, the side of flow pipes and water pipe that facing the inside of than 7 is made vertically flat instead of round, so that detritus can't be trapped under the flow and water pipes. As illustrated in FIG. 9, flow guiding structure 3 and screen plate 4 are made into one piece to make manufacturing and assembling of the present invention much easier. As illustrated in FIG. 10, flow pump 11 having two outlet 112 instead of one, such that flow pump 11 can pump more water into flow pipes and generate more and stronger flows, and flow pump 11 can also be more securely mounted on flow pipe. As illustrated in FIG. 11, lift pump inlet 21 having some openings on the side and is placed in contact or very closed to tank bottom 71, such that stronger suction force can be created by lift pump 2 to intake detritus further away from lift pump inlet 21. As illustrated in FIG. 12, flow pipes, flow guiding walls and screen plate can be divided into many smaller sections, such that the overall size of the system can be adjusted by adding or removing some sections. Multiple flow pumps, multiple lift pumps, or multiple systems of the present invention can be used for a large tank. Width side water pipe 13 can be eliminated, in this case the two ends of length water pipes 14 are sealed so that water will be forced out of flow nozzles. Flow pump 11 and lift pump 2 can be placed outside tank 7. Also, the present invention can be used for aquarium tanks with more than 4 sides.

Thus the scope of the present invention should be determined by the appended claims and their legal equivalents, rather than by the examples given.

Having thus disclosed a number of preferred embodiments of the invention, it being understood that numerous modifications and additions are contemplated and will now be apparent to those having benefit of the above disclosure, what is claimed is:

1. An aquarium detritus removal system used for removing detritus from an aquarium tank having a tank bottom, a first tank width side, a second tank width side, a first tank length side and a second tank length side, said tank length sides are not shorter than said tank width sides, said aquarium detritus removal system comprising:
(a) a lift pump having a lift pump inlet and a lift pump outlet for delivering water from said tank to a filtering device; wherein said lift pump inlet is placed in an appropriate location on said tank bottom;

(b) a flow generating device for generating directed flows on said tank bottom comprising:
  (1) at least one width flow pipe having a first end and a second end, the length of said width flow pipe is shorter than the length of said tank width side, one side of said width flow pipe having a plurality width flow nozzles;
  (2) at least one length flow pipe having a first end and a second end, the length of said length flow pipe is shorter than said tank length side, one side of said length flow pipe having a plurality length flow nozzles, the height of said length flow pipe is the same as the height of said width flow pipe;
  (3) at least one flow pump having a flow pump inlet and a flow pump outlet;
  wherein said width flow pipe is placed on said tank bottom along one of said tank width side, with said width flow nozzles parallel to said tank bottom and point to the direction of said lift pump inlet;
  wherein said length flow pipe is placed on said tank bottom along one of said tank length side, with said length flow nozzles parallel to said tank bottom and point to the direction of said lift pump inlet;
  wherein the adjacent ends of said width flow pipe and said length flow pipe are connected together to form a complete flow pipe; wherein the unconnected ends of said width flow pipe and said length flow pipe are sealed or constructed in such way that no water can come out from said unconnected ends;
  wherein said flow pump outlet is connected to an appropriate location on said complete flow pipe, such that water intake by said flow pump can be delivered to said complete flow pipe;
(c) a flow guiding means for redirecting all flows coming out from said width flow nozzles and said length flow nozzles right to said lift pump inlet, said flow guiding means comprising at least one flow guiding wall that having a first end and a second end, said flow guiding wall can be constructed from a thin strip placed on said tank bottom, or can be formed from one of said tank width side or one of said tank length side;
  wherein said first end of said flow guiding wall is in contact or close to an appropriate point on said complete flow pipe, said second end of said flow guiding wall is extended to said lift pump inlet and being a small distance away from said lift pump inlet;
  wherein said lift pump inlet, said width flow nozzles, said length flow nozzles and said flow guiding structure are arranged in such way that flows coming out from said width flow nozzles and said length flow nozzles at different angles will be separated by said flow guiding structure until said flows redirected by said flow guiding structure, or until said flows reach said lift pump inlet, such that flows coming out from different angles won't interfere with each other;
  wherein said lift pump inlet, said width flow nozzles, said length flow nozzles and said flow guiding structure are arranged in such way that said width flow nozzles and said length flow nozzles either point to said lift pump inlet or point to a flow guiding wall at an angle, if a flow nozzle point to a flow guiding wall at an angle, flow coming out from said flow nozzle will be redirected by said flow guiding wall toward said lift pump inlet, or toward another flow guiding wall that point to said lift pump inlet;
  such that flow coming out from a flow nozzle that point to said lift pump inlet will move directly toward said lift pump inlet, flow coming out from a flow nozzle that point to a flow guiding wall will be redirected by said flow guiding structure and move along said flow guiding structure toward said lift pump inlet;
(d) a screen plate smaller than said tank bottom but a little bigger than said flow generating device, said screen plate having a number of small holes all over it, said small holes allow water and detritus move through said screen plate but prevent other objects like aquarium substrate from moving through said screen plate;
  wherein said screen plate is placed on top of said flow generating device and said flow guiding structure, such that a layer of substrate can be placed on top of said screen plate;
(e) a tubing having a first end and a second end for connecting said lift pump to said filtering device;
  wherein said first end of said tubing is connected to said lift pump outlet, said second end of said tubing is connected or placed near the inlet of said filtering device;
whereby when said tank is filled with water and said aquarium detritus removal and filtration system works, said flow pump intake water from said tank and deliver said water to said width flow pipe and said length flow pipe, since no water can come out from said sealed ends of said width flow pipe and length flow pipe, said water is forced out of said width flow nozzles and said length flow nozzles and move either directly toward said lift pump inlet or
toward said flow guiding structure, flows move toward said flow guiding structure will be redirected by said flow guiding structure and move along said flow guiding structure toward said lift pump inlet, such that all flows generated by said flow generating device are guided toward and pass said lift pump inlet, such that water containing detritus can be taken in by said lift pump and delivered to said filtering device for filtration and returning to said tank.

2. The aquarium detritus removal system of claim 1 wherein said width flow pipe and length flow pipe having a vertical flat side on the side that facing the inside of said tank, such that no detritus can be trapped under said flow pipes.

3. The aquarium detritus removal system of claim 1 wherein said screen plate having a thickness no less than 3 mm, such that said small holes on said screen plate can provide sufficient bedding area for beneficiary bacteria.

4. The aquarium detritus removal system of claim 1 wherein said flow guiding structure and said screen plate are made into one piece.

5. The aquarium detritus removal system of claim 1 wherein said flow pump having two flow pump outlets instead of one, such that said flow pump is able to pump more water into said flow generating device to generate more and stronger flows, such that said flow pump can be more securely affixed to said complete water pipe.

6. The aquarium detritus removal system of claim 1 wherein said lift pump inlet having some openings on the side and is placed in contact or very closed to said tank bottom, such that stronger suction force can be created by said lift pump to intake detritus further away from said lift pump inlet.

7. The aquarium detritus removal system of claim 1 wherein said flow pipes are divided into a number of smaller flow pipe sections, said flow guiding structure is divided into a number of smaller sections, said screen plate is divided into a number of smaller screen plate sections, such that the overall size of said aquarium detritus removal and filtration system can be adjusted by adding or removing some of said smaller sections.

8. The water pipe sections and screen plate sections of claim 7 wherein each said water pipe section is affixed to the bottom of a corresponding said screen plate section, such that the whole screen plate can be easily assembled together by connecting said water pipe sections.

9. An aquarium detritus removal system used for removing detritus from an aquarium tank having a tank bottom, a first tank width side, a second tank width side, a first tank length side and a second tank length side, said tank length sides are not shorter than said tank width sides, said aquarium detritus removal system comprising:
(a) a flow generating device for generating directed flows on said tank bottom comprising:
   (1) a width flow pipe having a first end and a second end, the length of said width flow pipe is shorter than the length of said tank width side, one side of said width flow pipe having a plurality width flow nozzles;
   (2) a first length flow pipe having a first end and a second end, the length of said first length flow pipe is shorter than said tank length side, one side of said first length flow pipe having a plurality first length flow nozzles pointing to the direction of said second end, the acute angel between said first length flow nozzle and said first length flow pipe is larger than 15 degrees but less than 75 degrees; the height of said first length flow pipe is the same as the height of said width flow pipe;
   (3) a second length flow pipe having a first end and a second end, the length of said second length flow pipe is shorter than said tank length side, one side of said second length flow pipe having a plurality second length flow nozzles pointing to the direction of said second end, the acute angel between said second length flow nozzle and said second length flow pipe is larger than 15 degrees but less than 75 degrees, the height of said second length flow pipe is the same as the height of said width flow pipe;
   (4) at least one flow pump having a flow pump inlet and a flow pump outlet;
   wherein said width flow pipe is placed on said tank bottom along the edge of said first tank width side, with said width flow nozzles parallel to said tank bottom and pointing to the direction of said second tank width side;
   wherein said first length flow pipe is placed on said tank bottom along the edge of said first tank length side, said first end of said first length flow pipe is connected to said first end of said width flow pipe, said first length flow nozzles are parallel to said tank bottom and pointing to the direction of said second tank width side;
   wherein said second length flow pipe is placed on said tank bottom along the edge of said second tank length side, said first end of said second length flow pipe is connected to said second end of said width flow pipe, said second length flow nozzles are parallel to said tank bottom and pointing to the direction of said second tank width side;
   wherein said second ends of said first length flow pipe and said second length flow pipe are sealed or constructed in such way that no water can come out from said second ends;
   wherein said flow pump outlet is connected to the middle portion of said width flow pipe, said flow pump inlet is placed in a location that can intake water from said tank, such that water intake by said flow pump from said tank can be delivered to said width flow pipe, said first length flow pipe and said second length flow pipe;
(b) a lift pump having a lift pump inlet and a lift pump outlet for delivering water from said tank to a filtering device;
   wherein said lift pump inlet is placed on said tank bottom, and in or near the middle between said second end of said first length flow pipe and said second end of said second length flow pipe;
(c) a flow guiding means for redirecting all flows coming out from said width flow nozzles and said length flow nozzles right to said lift pump inlet, said flow guiding means constructed from thin strips, said thin strips can be vertically placed on said tank bottom to form flow guiding walls, said flow guiding means comprising at least one central flow guiding wall, said central flow guiding wall having a first end, a second end and having a length a little shorter than the length of said length flow pipes, and having a height the same as said width side flow pipe;
   wherein said central flow guiding wall is placed on the middle between said first length flow pipe and said second length flow pipe and parallel to said length flow pipes, said first end of said central flow guiding wall in contact with or very close to the middle of said width flow pipe, said second end of said central flow guiding wall extended to said lift pump inlet and being a small distance away from said lift pump inlet;
(d) a screen plate smaller than said tank bottom but a little bigger than said flow generating device, said screen plate having a number of small holes all over it, said small holes allow water and detritus move through said screen plate but prevent other objects like aquarium substrate from moving through said screen plate;
   wherein said screen plate is placed on top of said flow generating device and said flow guiding structure, such that a layer of substrate can be placed on top of said screen plate;
(e) a tubing having a first end and a second end for connecting said lift pump to said filtering device;
   wherein said first end of said tubing is connected to said lift pump outlet, said second end of said tubing is connected or placed near the inlet of a filtering device;
whereby when said tank is filled with water and said aquarium detritus removal system works, said flow pump intake water from said tank and deliver said water to said width flow pipe, said first length flow pipe and said second length flow pipe, since no water can come out from said second ends of said first and second length flow pipes, a portion of said water is forced out of said width flow nozzles and move toward said lift pump inlet, a portion of said water is forced out of said first length flow nozzles and move toward said central flow guiding wall at said acute angle, a portion of said water is forced out of said second length flow nozzles and move toward said central flow guiding wall at said acute angle, when water coming out from said first length flow nozzles and second length flow nozzles hit said central flow guiding wall, they will be redirected by said central flow guiding wall and move along said central flow guiding wall toward said lift pump inlet, such that all flows generated by said flow generating device are guided toward and pass said lift pump inlet, such that water containing detritus can be taken in by said lift pump and delivered to said filtering device for filtration.

10. The aquarium detritus removal system of claim 9 wherein said flow guiding means further comprising a first corner flow guiding wall having a first end and a second end, a second corner flow guiding wall having a first end and a second end, said first corner flow guiding wall is placed on said tank bottom with said first end of said first corner flow guiding wall in contact or close to said first end of said width water pipe, said second end of said first corner flow guiding wall extend to said central flow guiding wall at said acute angle, and being a small distance away from said central flow guiding wall; said second corner flow guiding wall is placed on said tank bottom with said first end of said second corner flow guiding wall in contact or close to said second end of said width water pipe, said second end of said second corner flow guiding wall extend to said central flow guiding wall at said acute angle, and being a small distance away from said central flow guiding wall;

whereby flows coming out from said width flow nozzles will be separated by said first corner flow guiding wall and said second corner flow guiding wall from flows coming out from said first length flow nozzles and said second length flow nozzles before they are close to said central flow guiding wall;

whereby flows coming out from said width flow nozzles will be redirected toward said central flow guiding wall by said first corner flow guiding wall and said second corner flow guiding wall.

* * * * *